US006982961B2

(12) United States Patent
Refai et al.

(10) Patent No.: US 6,982,961 B2
(45) Date of Patent: Jan. 3, 2006

(54) PUSH-TO-TALK AND PUSH-TO-CONFERENCE IN A CDMA WIRELESS COMMUNICATIONS SYSTEM

(75) Inventors: Wail M. Refai, Apex, NC (US); Robert C. Witter, Chapel Hill, NC (US); Essam Sourour, San Diego, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 915 days.

(21) Appl. No.: 09/909,395

(22) Filed: Jul. 19, 2001

(65) Prior Publication Data

US 2003/0016632 A1 Jan. 23, 2003

(51) Int. Cl.
H04Q 7/00 (2006.01)

(52) U.S. Cl. .................................. 370/265; 379/202.01

(58) Field of Classification Search ................ 370/328, 370/335, 336, 266, 263, 265, 260, 329, 341, 370/431, 330; 455/518, 422.1, 450, 422, 455/426; 380/271; 379/202.01
See application file for complete search history.

(56) References Cited

U.S. PATENT DOCUMENTS

| 4,873,711 A | 10/1989 | Roberts et al. |
| 4,979,231 A | 12/1990 | Johnson et al. |
| 5,491,835 A * | 2/1996 | Sasuta et al. ................ 455/509 |
| 5,594,948 A * | 1/1997 | Talarmo et al. ............. 455/518 |
| 5,914,958 A | 6/1999 | Chinitz et al. |
| 6,005,848 A * | 12/1999 | Grube et al. ................ 370/266 |
| 6,115,388 A | 9/2000 | Chinitz et al. |
| 6,178,166 B1 | 1/2001 | Wilson et al. |
| 6,181,685 B1 | 1/2001 | Chinitz et al. |
| 6,188,767 B1 * | 2/2001 | Needham et al. ........... 380/271 |
| 6,741,856 B2 * | 5/2004 | McKenna et al. ....... 455/422.1 |

FOREIGN PATENT DOCUMENTS

| WO | WO 00/69189 | 11/2000 |
| WO | WO0069189 | 11/2000 |

* cited by examiner

Primary Examiner—John Pezzlo
(74) Attorney, Agent, or Firm—Coats & Bennett, P.L.L.C.

(57) ABSTRACT

A method of providing push-to-talk and push-to-conference functionality in a CDMA system. Participants, in one embodiment, may be divided into active and inactive participants with active participants assigned a private uplink/downlink channel pair by the communication system. Inactive participants may be assigned a public downlink channel. In one embodiment, silent active participants of a conference or talk session are timed out and the private uplink/downlink channel pair previously assigned to such individuals are released for use elsewhere in the network or by other members of the conference. In a push-to-talk embodiment one private uplink/downlink channel pair may at any given time be passed between the presently active members of the group.

16 Claims, 4 Drawing Sheets

Figure 1:
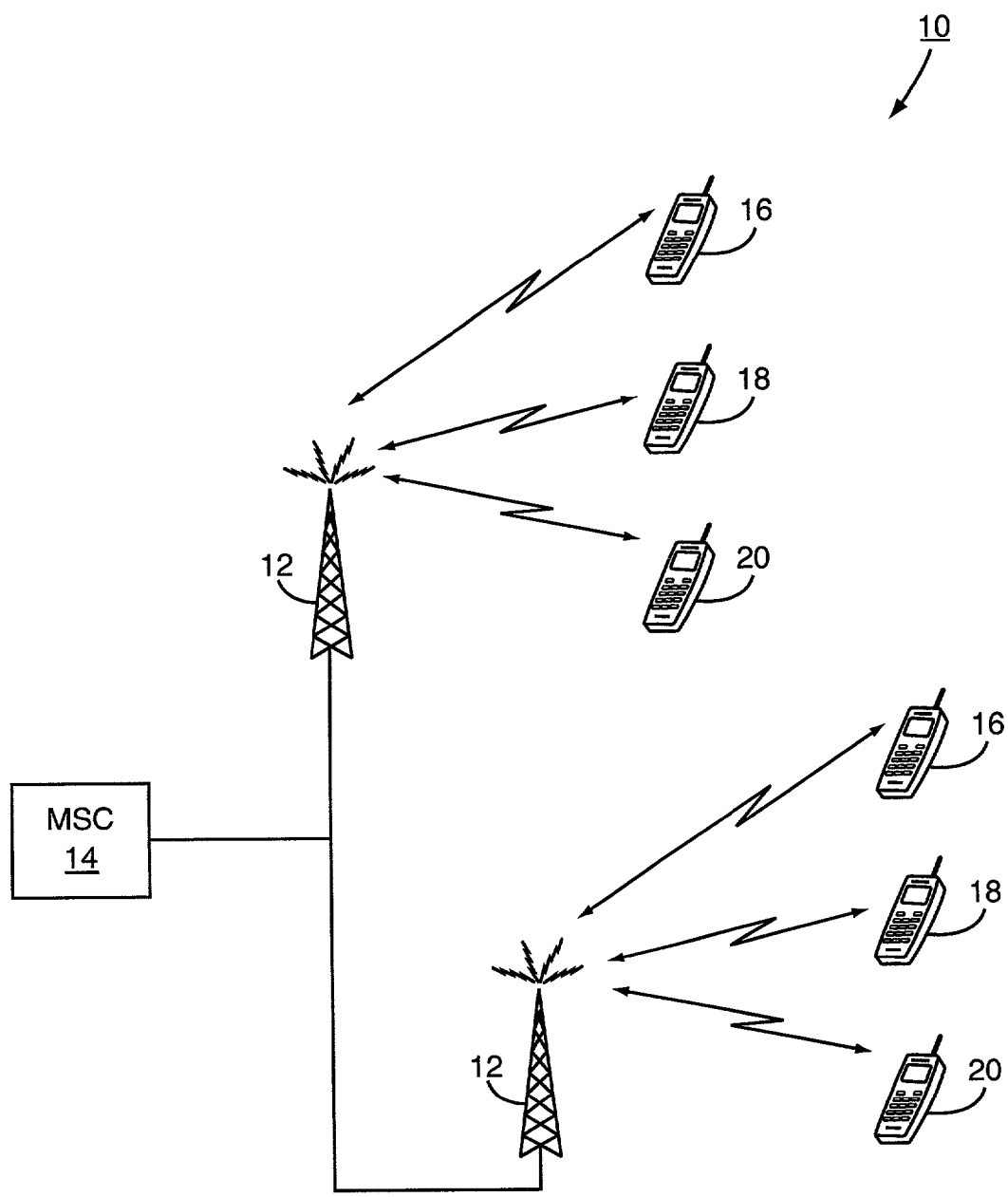
Figure 2:
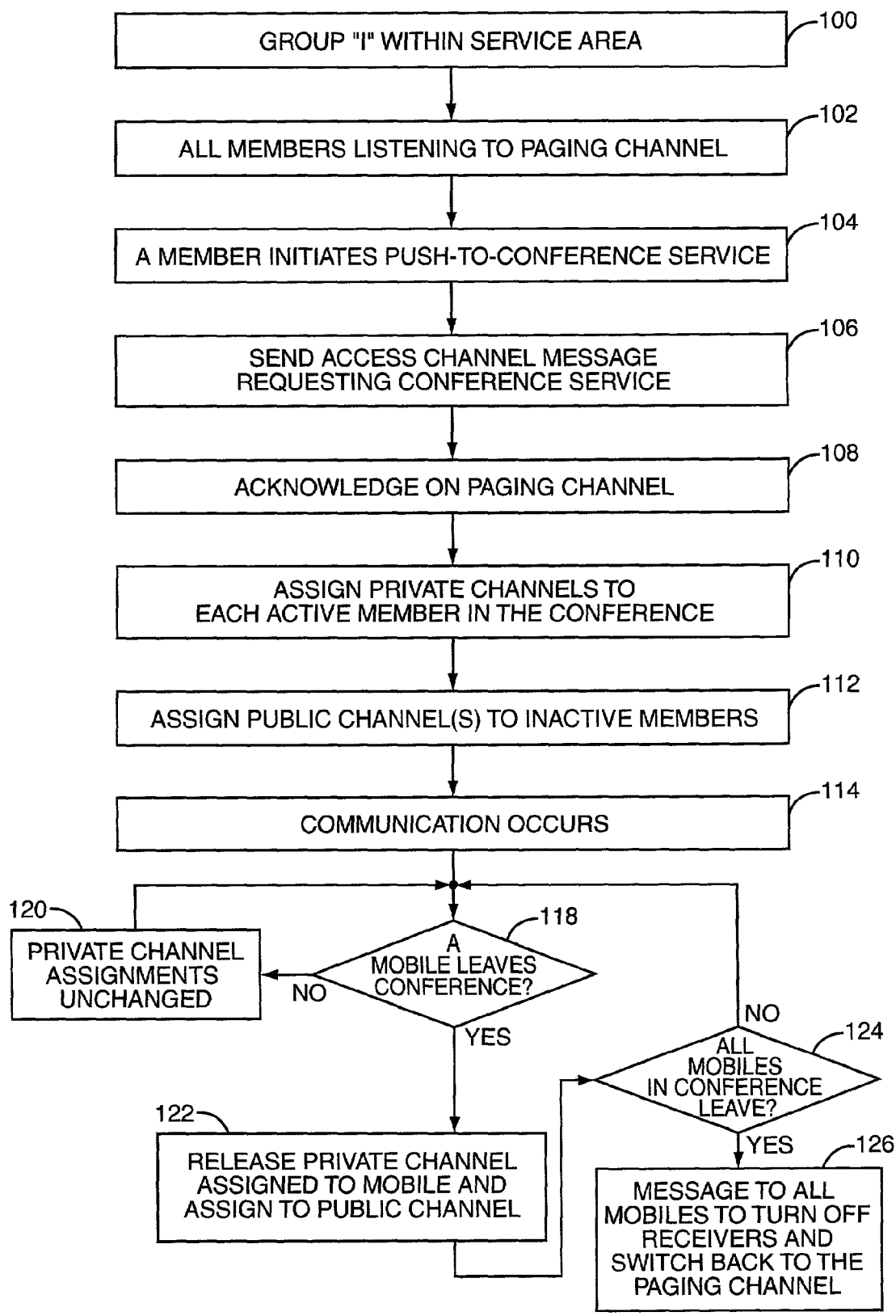

PUSH-TO-TALK AND PUSH-TO-CONFERENCE IN A CDMA WIRELESS COMMUNICATIONS SYSTEM

BACKGROUND OF THE INVENTION

The present invention is related to a CDMA wireless communications system that enables push-to-talk and push-to-conference communications.

Wireless communications systems, such as cellular systems, have at least two popular formats by which bandwidth capabilities are maximized. The first is known as TDMA, or time division multiple access, and divides a frequency channel into time slots. The second is known as CDMA, or code division multiple access, which allows simultaneous broadcasts using different orthogonal codes such that a filter may use the orthogonal codes to eliminate or reduce the interference between different users.

While most cellular phone calls allow full duplex communications, some communications may be handled in a half-duplex manner, where only one party to the call is allowed to talk at a time. One example of such an arrangements is known as "Push-to-talk" functionality, where a party may both talk and listen during a call, but not both simultaneously. Such an arrangement essentially mimics the capabilities of a CB radio or walkie-talkie. TDMA systems have for several years had "push-to-talk" capabilities, as exemplified by U.S. Pat. Nos. 4,979,231 and 4,873,711. However, the push-to-talk has not been substantially available in CDMA systems, due to a number of technical difficulties.

SUMMARY OF THE INVENTION

The present invention incorporates push-to-talk and push-to-conference functionality for group calls into a CDMA enabled wireless communication system. Members of the group call are placed into active or inactive status, wherein active members are assigned, and communicate on, a private uplink/downlink channel pair, while inactive members listen on a public downlink channel.

To economize channel allocation within a cell, some embodiments of the present invention monitor the length of time in-between instances of an active user speaking. If a timer for the active user exceeds a predetermined threshold, then that user is reclassified as inactive, and his uplink/downlink channel pair is relinquished.

Further, there may be situations in which inactive members wish to participate in a call. Normally, the inactive member would ask for access and be assigned a private uplink/downlink channel pair. However, if all the private uplink/downlink channel pairs are in use, the active member who has not spoken in the longest time may be moved to inactive status, and the requesting inactive member moved to an active status utilizing the uplink/downlink channel pair released thereby.

BRIEF DESCRIPTION OF DRAWINGS

FIG. 1 illustrates a wireless communication system;

FIG. 2 illustrates a flow chart exemplifying a push-to-conference process according to the present invention;

FIG. 3 illustrates a flow chart exemplifying a channel management approach push-to-conference process according to the present invention; and FIG. 4 illustrates a flow chart exemplifying a push-to-talk process according to the present invention.

DETAILED DESCRIPTION OF THE INVENTION

A wireless communication system 10 comprises one or more base stations 12, an MSC 14, and a plurality of mobile terminals 16,18,20. For the purposes of this invention, the wireless communication system 10 operates generally according to the well-known industry standard CDMA protocol IS-2000, but other CDMA protocols could be used, such as WCDMA and the like. The disclosures of these two protocols are hereby incorporated by reference in their entireties. It should be appreciated that wireless communication system 10 may comprise a plurality of base stations 12, MSCs 14, and be connected to the Public Land Mobile Network (PLMN), the Public Switched Telephone Network (PSTN) (neither shown), or other communication networks as is well understood.

A user may acquire a mobile terminal 16,18, or 20 in any manner known in the art and be associated with one or more "groups" for group calling purposes. For example, the user's account may be linked to a group ID (GID), which may be a preexisting group or a group created at the instigation of the user. Additionally, the user is given a member ID (MID) within the group. It should be noted that the user may be assigned to a group after actuation of the mobile terminal or at some other time as needed or desired. However, the service provider should be alerted to which users belong to which groups so that the service provider may allocate resources in light thereof. Further, it is possible that ad hoc groups may be formed as needed or desired and still take advantage of the present invention's functionality.

Having formed groups, with each member of the group having a MID, it is possible to implement the push-to-conference functionality of the present invention as illustrated in FIG. 2. Initially, a base station 12 has a group "I" present within the area served by the base station 12 (block 100). Assuming that the members of the group have their mobile terminals 16,18,20 turned on, the respective mobile terminals 16,18,20 are listening to the paging channel of the base station 12 (block 102). A member of the group feels that he has something to say to multiple members of the group and would like their feedback in a conference-type environment, so that member initiates the push-to-conference service (block 104). That member's mobile terminal, e.g., mobile terminal 20, sends an ACCESS CHANNEL message to the base station 12 requesting the conference service (block 106). This request may include the MID of the requesting member, the MIDs of the members requested to be "active" in the conference, and the GID. "Active" members of the group call are those members of the group who are authorized to both talk and listen during the group call; "inactive" members of the group call are those members of the group who are authorized to listen to the group call, but not to talk. For instance, a company may have many employees dispersed at various locations in the field, all of whom have mobile terminals. The workers may be classified as "inactive" (i.e., listen only) for a given call, while supervisors and project managers may be classified as "active" (i.e., both talk and listen). One advantage of classifying some group members as "inactive" is that they do not need to be assigned an uplink channel, as described further below.

The base station 12 acknowledges the request to set up a group call on the paging channel (block 108). This acknowledgement may likewise include the GID and the relevant MIDs. The CDMA wireless communications system 10, typically the MSC 14, assigns each active member that responds and has been requested to join the conference, as well as the original requesting member, their own uplink and downlink channel pair, such as by assigning unique Walsh codes thereto (block 110). Both an uplink and a corresponding downlink channel are assigned so that these members may both talk and listen during the group call, particularly without having to request a channel each time they want to talk. These active members may be logically in one cell or in multiple cells. The inactive members of the group—those that are supposed to listen to the conference, but may not have any need to participate—are assigned to a public downlink channel, such as sharing a common Walsh code (block 112). In other words, if more than one inactive member of the group is logically within one cell, then all the inactive members in that cell share a common downlink channel for communications from the base station 12. Of course, inactive members in other cells may be assigned to a different public downlink channel, depending on the needs of the system 10. The inactive members are not assigned uplink channels.

Communication then occurs (block 114). In this manner, active class members that are part of the conference talk by pushing a button or other actuating mechanism on their mobile terminals 16,18,20 and speaking. In one embodiment, multiple active members may speak concurrently, thus creating something of a cacophonous environment. In another embodiment, artificial controls may be used to restrict such concurrent usage so that active class users may only talk or listen, not both at the same time. These artificial controls may be implemented in the mobile terminal 16,18, 20 or the base station 12 as needed or desired. In general, the mobile terminals 16,18,20 of the active participants send and receive both forward and reverse links on the private uplink/ downlink channel pair. Thus, the active members, which are authorized to talk, may have transmit power control effectuated in the standard way. For instance, power control messages from the base station 12 may be sent on the private downlink channel for controlling the mobile terminal's transmit power on the corresponding uplink channel. In contrast, the mobile terminals 16,18,20 of the inactive participants are not subject to transmit power control, because they are not transmitting on an associated uplink channel.

Because an uplink channel is not assigned to the inactive members, needless power control computations can be avoided, and these "unassigned" channels may be assigned to other users of the system 10. Further, while the mobile terminals 16,18,20 of the active members will need to turn on both their transmitters and receivers, the mobile terminals 16,18,20 of the inactive members need only turn on their receivers, thereby saving power. Also, only one forward link traffic control, using the public downlink channel and not forward link power controlled, need be used in each cell where there are one or more inactive group members, and no reverse link power control bits need be inserted on the forward link traffic control since the inactive members are not transmitting any power.

It should be noted that when an active member is not actually talking, its variable rate vocoder may advantageously automatically work at a ⅛ data rate and the mobile terminal will transmit ⅛ of the nominal power.

While an active class mobile terminal 16,18,20 is engaged in the group call, the system determines if an active mobile terminal has left the conference (block 118). If the answer is no, all the active mobile terminals 16,18,20 are still participating in the call, the private uplink/downlink channels remain assigned thereto (block 120). If an active participant relinquishes its active status (thus answering block 118 affirmatively), the private uplink/downlink channels assigned to the mobile terminal 16,18,20 in question are released and the mobile terminal 16,18,20 is assigned to listen on the public downlink channel by the base station 12 (block 122). If all the active class mobile terminals 16,18,20 in the call have left the call (block 124), the base station 12 sends a message to all the mobile terminals 16,18,20 to idle their receivers and switch back to listening to the paging channel (block 126). Otherwise, the process continues as indicated.

In some situations, inactive members of the group may be allowed to change classification, to become active class members, by actuating the appropriate command at their mobile terminals 16,18,20. When such members become active, they stop using the public downlink channel, and instead use a private uplink/downlink channel pair assigned by the system 10.

The system 10 may take measures to control the number and allocation of channels associated with the group call. For instance, there may be a maximum number "N" of active members that may be allowed to participate in the group call based on the number of available channels and/or depending upon on traffic load in the system 10. These available channels may be assigned on a first come, first served basis (block 162) (see FIG. 3). In response to a request for another private uplink/downlink channel pair for the group call (due to, e.g., a reclassification request or movement of an active member) the number of allocated channels is compared against the maximum N (block 164). If the number of requested channels exceeds the maximum N, then the active member with the longest silence time may be reclassified as inactive, switched to a public downlink channel, and a new active member is assigned the newly vacated private uplink/ downlink channel pair (block 172). If the number of channels allocated does not exceed N, the base station 12 may determine if any active members have been silent for a time greater than a predetermined threshold (block 166). If the answer is no, then the channels remain assigned as is (block 168). If the answer to block 166 is yes, then the active member that has been silent longer than the predetermined threshold is reclassified as inactive, and switched to a public downlink channel (block 170). If all of the active members have been silent longer than a second predetermined threshold (block 174), the base station 12 sends a message to all the members to idle their receivers and switch back to monitoring the paging channel (block 176); otherwise the process continues as indicated.

It is likewise possible to use two activity timers T1 and T2 (T2>T1), such that when T1 expires, the mobile terminal 16,18,20 of an active member stops transmitting the reverse Traffic Channel, but keeps sending the reverse Pilot Channel. This keeps the base station 12 synchronized with the mobile terminal 16,18,20 for quick access. If T2 expires, the mobile terminal 16,18,20 for the active member stops transmitting on the Pilot Channel as well, the private uplink/ downlink channel pair may be released, and the member converts to inactive status.

Figure 4:
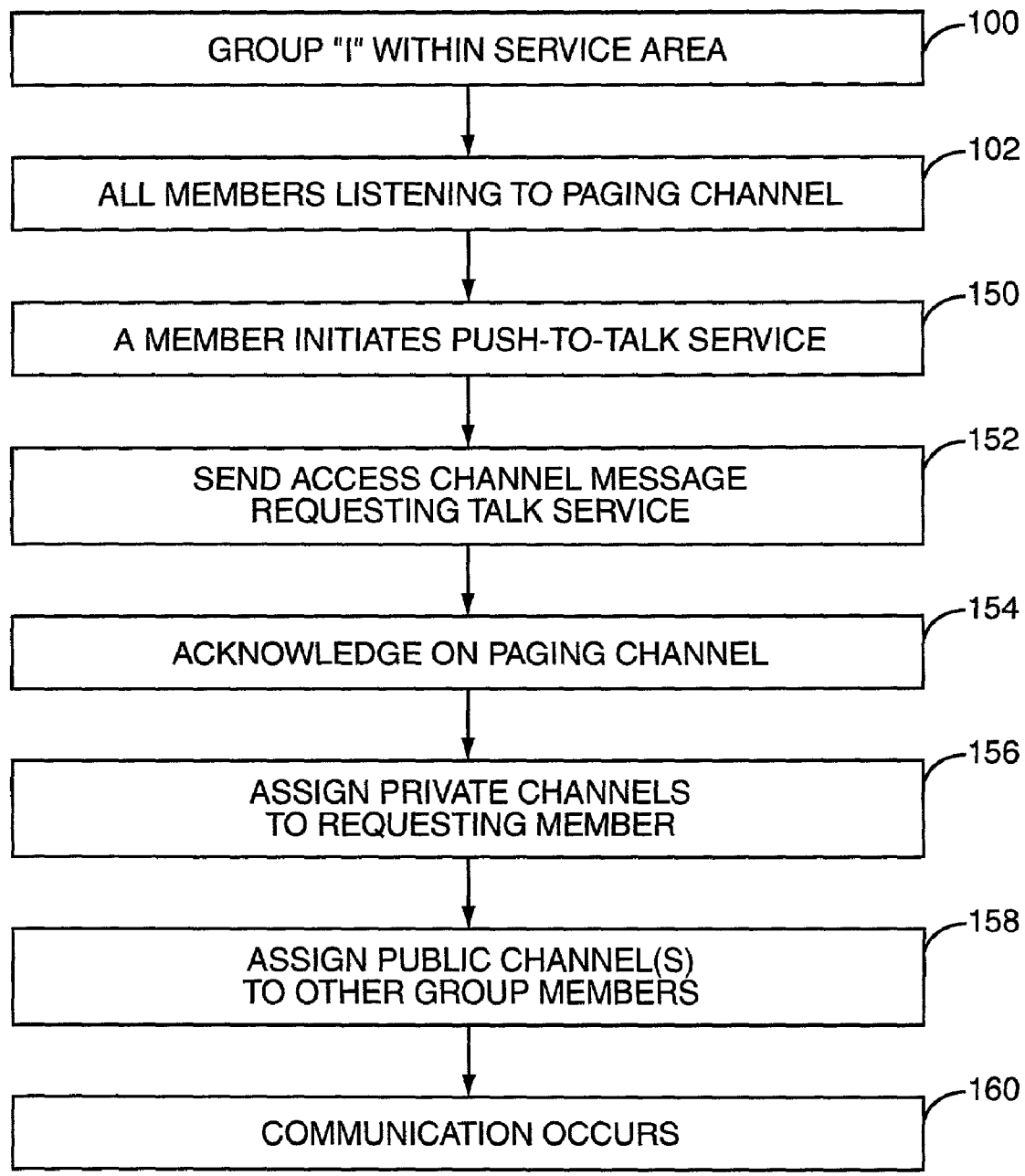

A special version of the push-to-conference set up is the push-to-talk functionality of the present invention. This is explicated with reference to FIG. 4. The base station 12 has a group "I" within the area served by the base station 12 (block 100) with all the members of group I listening to the paging channel (block 102). A member initiates the push-to-talk service (block 150) by actuating an appropriate command on a mobile terminal 16,18,20 within the service area. The mobile terminal 16,18,20 sends an ACCESS channel message to the base station 12 requesting talk service (block 152). This request may include the MID, the GID, and other appropriate information as needed or desired.

Figure 3:
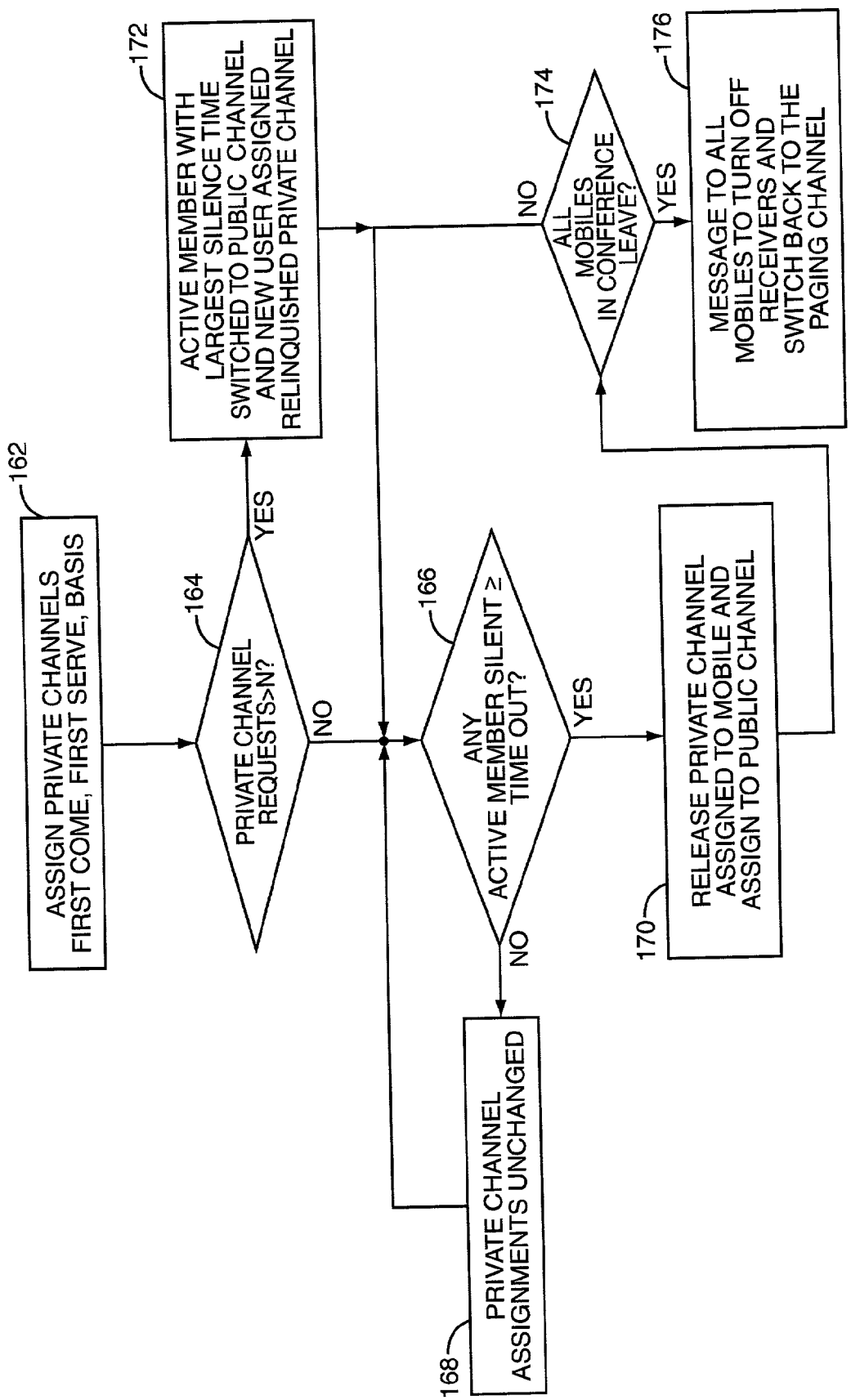

The base station 12 transmits an acknowledgement on the paging channel that includes the GID, and the MID of the member requesting the talk (block 154). The base station 12 assigns a uplink/downlink channel pair to the member requesting the service (block 156), while the other members of the group are assigned to a public downlink code (block 158). Thus, the requesting member is active status, while the other members are inactive. Communication for this push-to-talk process then occurs according to the appropriate standard (block 160), with subsequent steps as shown in FIG. 3. The primary difference with respect to the push-to-conference approach described above is that only one member is active at a time, as opposed to the potential for many active class members in the push-to-conference situation.

In another embodiment of the push-to-talk process, when a second member pushes to talk, the system 10 may release the private uplink/downlink channel pair assigned to the first member, reassign the first member to the public downlink channel, and assign the second member to a private uplink/downlink channel pair, such as the just vacated private uplink/downlink channel pair or another private uplink/downlink channel pair. It should be noted that such an approach may result in a slight delay in being able to speak.

As used herein, the term "mobile terminal" 20 may include a cellular radiotelephone with or without a multi-line display; a Personal Communications System (PCS) terminal that may combine a cellular radiotelephone with data processing, facsimile and data communications capabilities; a Personal Digital Assistant (PDA) may include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals 20 may also be referred to as "pervasive computing" devices.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of handling a group call in a CDMA wireless communications system, comprising:

classifying members of a group call into a first class or a second class, said first class comprising members authorized to both talk and listen, said second class comprising members authorized to listen but not to talk;

initially assigning a private downlink channel to each member of said group call belonging to said first class;

assigning a public downlink channel to at least one member of said group call belonging to said second class;

changing the classification of a first member of said group call belonging to said first class to be said second class in response to said member not talking for a predetermined time period during said group call; and changing the downlink channel assignment of said first member from said respective private channel to said public downlink channel assigned to said at least one member of said group call belonging to said second class in response to said change in classification.

2. The method of claim 1 further comprising providing both private and public downlink channels simultaneously.

3. The method of claim 1 further comprising changing the downlink channel assignment in response to a request to speak from at least one member of said group call belonging to said second class.

4. The method of claim 1 further comprising staggering a change of status for pilot channels and traffic channels as members of said first group transition to members of said second group.

5. The method of claim 1 further comprising placing a member of said second group on said respective private channel just freed by said changing the downlink channel assignment of said first member from said respective private channel to said public downlink channel.

6. A method of handling a group call in a CDMA wireless communications system, comprising:

classifying members of a group call into a first class or a second class, said first class comprising members authorized to both talk and listen, said second class comprising members authorized to listen but not to talk;

initially assigning a private downlink channel to each member of said group call belonging to said first class;

assigning a public downlink channel to at least one member of said group call belonging to said second class;

initially transmitting voice on a Reverse Traffic Channel and a pilot signal on a Reverse Pilot Channel, during said group call, by a first member of said group call belonging to said first class; and thereafter, ceasing transmission on the Reverse Traffic Channel, during said group call, by a first member in response to said first member not talking for a first predetermined time period during said group call, while continuing to transmit the pilot signal on the Reverse Pilot Channel.

7. The method of claim 6 further comprising:

thereafter, ceasing transmission of the pilot signal on the Reverse Pilot Channel, during said group call, by said first member in response to said first member not talking for a second predetermined time period during said group call; and changing the downlink channel assignment of said first member from said respective private channel to said public downlink channel in response to said first member not talking for said second predetermined time period during said group call.

8. The method of claim 6 further comprising ending said group call when all of said members are silent for a length of time greater than a predetermined threshold.

9. The method of claim 6 further comprising processing, at said base station both private and public downlink channels concurrently.

10. The method of claim 6 further comprising allowing members of said second class to move to said first class and further assigning such moving members a private downlink channel on which to communicate.

11. A method of handling a group call in a CDMA wireless communications system, comprising:

classifying members of a group call into one of either a first class or a second class, said first class comprising members authorized to both talk and listen, said second class comprising members authorized to listen but not to talk;

initially assigning a private downlink channel and a private uplink channel to a first member of said group call belonging to said first class;

initially assigning the remaining members of said group call to one or more public downlink channels; and thereafter, during said group call, substantially simultaneously:

reclassifying said first member to said second class;

reassigning said first member to said public downlink channel;

reclassifying a second member of said group call belonging to said second class to said first class;

reassigning said private downlink channel and said private uplink channel to said second member.

12. A method of facilitating communication comprising:

establishing a group of users in a CDMA wireless communication system, each of said users having a mobile terminal;

initiating a call to at least one other user of the group from a first mobile terminal;

assigning a first private downlink channel to said first mobile terminal;

assigning other private downlink channels to mobile terminals associated with said at least one other user of the group as needed; and assigning a public downlink channel to remaining users of the group.

13. The method of claim 12 further comprising timing out users such that private downlink channels are freed for other users within the group.

14. The method of claim 12 further comprising allowing inactive users associated with the public downlink channel to secure a private downlink channel upon actuation of a command on their mobile terminal.

15. The method of claim 12 further comprising limiting the other private downlink channels to a predetermined number.

16. A method of handling a group call in a CDMA wireless communications system, comprising:

dividing members of a group call to a first class or second class, said first class comprising members authorized to both talk and listen, said second class comprising members authorized to listen but not to talk;

assigning a private downlink/uplink channel pair to a member of said first class for communicating between said member of said first class and a base station;

assigning a public downlink channel without a corresponding uplink channel to a member of said second class for receiving downlink communications from said base station;

wherein, during a given group call, said first member and said second member receive downlink communications from said base station over their respective downlink channels.

* * * * *